UNITED STATES PATENT OFFICE.

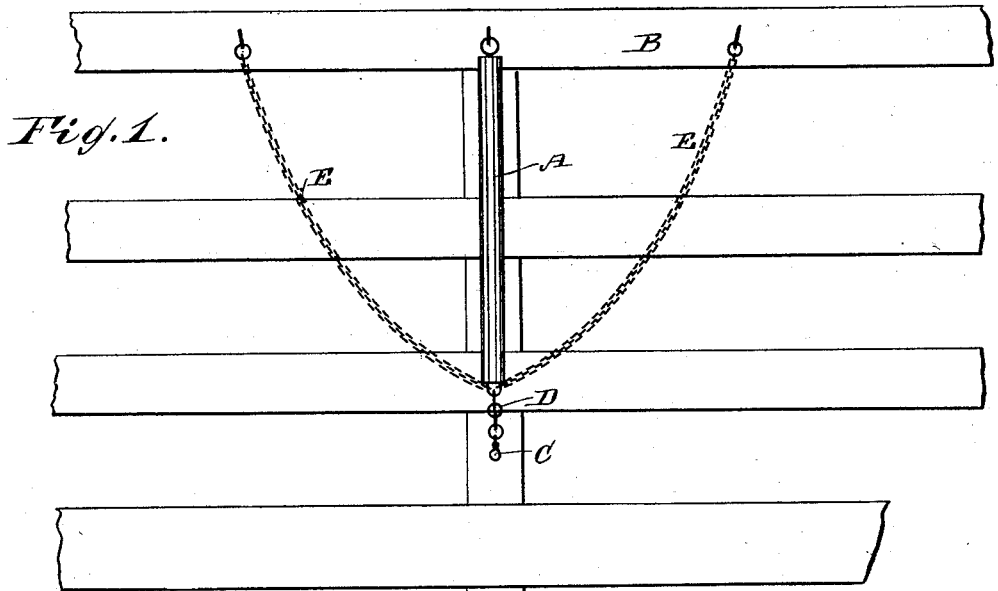
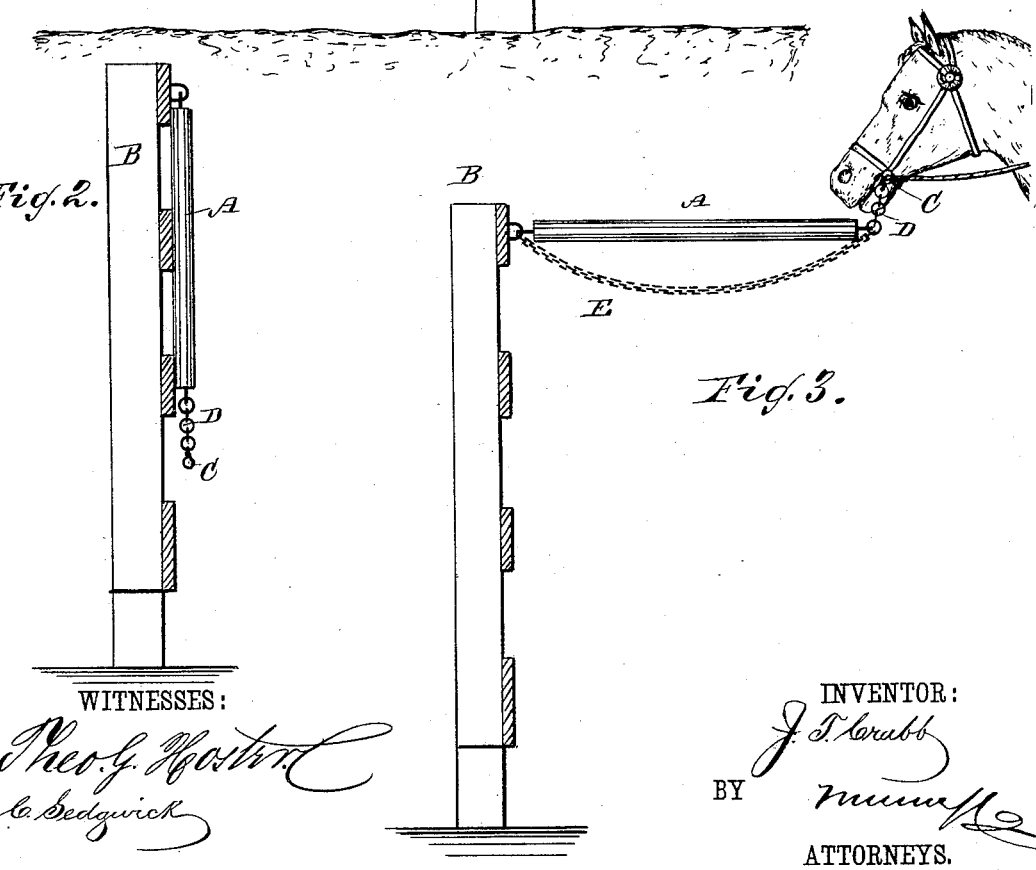

JAMES T. CRABB, OF EMINENCE, KENTUCKY.

HITCHING DEVICE.

SPECIFICATION forming part of Letters Patent No. 318,169, dated May 19, 1885.

Application filed November 11, 1884. (Model.)

*To all whom it may concern:*

Be it known that I, J. T. CRABB, of Eminence, in the county of Henry and State of Kentucky, have invented a new and Improved Hitching Device, of which the following is a full, clear, and exact description.

The object of my invention is to provide a new and improved permanent hitching device, which prevents horses from rubbing the bridles, slipping the bridles, or gnawing on fences, mangers, &c.

The invention consists in the combination, with a rod hinged on a fence, &c., of a snap-hook held on the free end of the rod, and of chains or rods secured to the free end of the rod and to the object on which the rod is held a short distance from the inner end of the rod.

Reference is to be had to the accompanying drawings, forming a part of this specification, in which similar letters of reference indicate corresponding parts in all the figures.

Figure 1 is a face view of my hitching device. Fig. 2 is a side view of the same showing the position when not in use. Fig. 3 is a side view of the same showing the position it has when in use.

An iron or wooden rod, A, is hinged by two eyes on a short piece of chain to a fence, B, the wall of a shed or post, or any other object to which horses are usually hitched, and to the free end of the rod a snap-hook, C, is held by a short piece of chain, D, or by a strap. Chains or rods E, secured to the free end of the rod A, are also secured to the fence B, a short distance from the hinged end of the rod.

The horse is hitched to the rod by means of the snap-hook C, thus preventing the horse from reaching the fence by going forward toward the fence, or by moving its head sidewise toward the fence. The horse is thus prevented from gnawing the fence, &c., slipping its bridle or rubbing the bridle. The chains or rods E are arranged to be slightly slack, so as to permit the horse to move its head sidewise a short distance.

Having thus described my invention, I claim as new and desire to secure by Letters Patent—

In a hitching device, the combination, with the hinged or swinging rod A, of the snap-hook C, held on the free end, and of the chains or rods E, secured to the free end of the rod and to the object on which the rod is held some distance from the inner end of the rod, substantially as herein shown and described.

JAMES T. CRABB.

Witnesses:
W. PAUL OTTE,
R. W. MOODY,
SYMMES LOCKWOOD.